United States Patent [19]

Jones

[11] Patent Number: 5,722,232
[45] Date of Patent: Mar. 3, 1998

[54] HYBRID HELIUM HEATER PRESSURIZATION SYSTEM AND ELECTRICAL IGNITION SYSTEM FOR PRESSURE-FED HYBRID ROCKETS

[75] Inventor: H. Stephen Jones, Lacombe, La.

[73] Assignee: Martin Marietta Corporation, Bethesda, Md.

[21] Appl. No.: 322,781

[22] Filed: Oct. 13, 1994

[51] Int. Cl.$^6$ ............... F02K 9/72; F02K 9/50
[52] U.S. Cl. ............ 60/259; 60/39.48; 60/726; 60/251
[58] Field of Search ............ 60/251, 256, 257, 60/258, 259, 260, 39.48, 726

[56] References Cited

U.S. PATENT DOCUMENTS

| | | | |
|---|---|---|---|
| 2,408,111 | 9/1946 | Truax et al. | 60/259 |
| 2,935,846 | 5/1960 | Neale et al. | 60/39.48 |
| 2,996,880 | 8/1961 | Greiner | 60/251 |
| 3,065,596 | 11/1962 | Schultz | 60/251 |
| 3,098,353 | 7/1963 | Abild | 60/259 |
| 3,136,119 | 6/1964 | Avery | 60/251 |
| 3,170,295 | 2/1965 | Dryden | 60/251 |
| 3,295,323 | 1/1967 | Holzman | 60/251 |
| 3,340,691 | 9/1967 | Mangum | 60/251 |
| 3,443,475 | 5/1969 | Berton | 60/251 |
| 3,516,251 | 6/1970 | Andrews et al. | 60/259 |
| 3,518,828 | 7/1970 | Bradford et al. | 60/39.82 |
| 3,570,249 | 3/1971 | Baum et al. | 60/259 |
| 3,595,020 | 7/1971 | Unterhaching et al. | 60/204 |
| 3,613,583 | 10/1971 | Lai et al. | 60/251 |
| 3,782,112 | 1/1974 | Muzzy | 60/251 |
| 3,788,069 | 1/1974 | Schmidt | 60/207 |
| 3,789,610 | 2/1974 | Stone | 60/245 |
| 3,803,858 | 4/1974 | Simon | 60/39.48 |
| 3,893,294 | 7/1975 | Bruun et al. | 60/39.6 M |
| 3,943,706 | 3/1976 | Grafwallner et al. | 60/204 |
| 5,010,730 | 4/1991 | Knuth et al. | 60/246 |
| 5,099,645 | 3/1992 | Schuler et al. | 60/219 |
| 5,119,627 | 6/1992 | Bradford et al. | 60/251 |
| 5,133,183 | 7/1992 | Asaoka et al. | 60/204 |
| 5,152,136 | 10/1992 | Chew et al. | 60/251 |
| 5,471,833 | 12/1995 | Pahl | 60/259 |

*Primary Examiner*—Timothy Thorpe
*Assistant Examiner*—Ted Kim
*Attorney, Agent, or Firm*—Pravel, Hewitt, Kimball & Krieger

[57] ABSTRACT

A system for pressurizing a liquid oxygen tank (20) in a pressure-fed hybrid rocket (100) provides pressure at a first end of the tank (20) so that liquid oxygen can exit the second end. A hybrid heater (50) creates the pressure by mixing gaseous oxygen with the solid fuel (51) in the hybrid heater (50) to create an extremely high temperature. Helium is then mixed with the combustion products via an inlet (60) and this hot, inert mixture enters the liquid oxygen tank (20) via a diffuser (70). A second hybrid heater (90) pressurizes the gaseous helium sphere (40) to reduce the pressure decay caused by the withdrawal of the helium. Two of the hybrid heaters (50 and 90) are fed gaseous oxygen from a sphere (30). A novel ignition system is used to ignite the hybrid heaters (50, 90, 250). One of the hybrid heaters (250) is used to ignite the hybrid motor (100) in the rocket (11).

30 Claims, 4 Drawing Sheets

HYBRID HELIUM HEATER PRESSURIZATION SYSTEM AND ELECTRICAL IGNITION SYSTEM FOR PRESSURE-FED HYBRID ROCKETS

BACKGROUND OF THE INVENTION

1. Field of the Invention

The present invention relates to pressure-fed hybrid rockets. More particularly, the present invention relates to a pressurization system for forcing oxidizer into a hybrid motor of a pressure-fed hybrid rocket and to a novel ignition system for pressure-fed hybrid rockets.

2. General Background of the Invention

A pressure-fed hybrid rocket requires a pressurization system for the oxidizer tank in order to force the oxidizer out of the oxidizer tank and into the hybrid motor. Classical forward-end injection hybrids typically have a chamber pressure in the range of 300 to 700 psia. Therefore, the oxidizer tank ullage pressure for a pressure-fed hybrid rocket is in the range of 400 to 800 psia. Pressurization system size and weight impacts vehicle size and weight, therefore affecting the payload attainable.

A reliable, safe ignition system is desirable for pressure-fed hybrid rockets. Prior to the present invention, there has been no such system.

There are various types of pressurization systems, the closest prior practice to the system of the present invention being an inert gas plus combustion pressurization system. The heat source for an inert gas plus combustion pressurization system in the past has been in the form of either a catalyst or gas generator. These types of heat source tend to be relatively expensive and inefficient in heating the pressurant, whereas the hybrid helium heater concept of the present invention provides a low cost pressurization system.

Bradford et al., U.S. Pat. No. 5,119,627 contains a good discussion of pressure-fed hybrid rockets, and is hereby incorporated by reference. In the paragraph spanning columns 1 and 2, the '627 patent describes a prior art pressurization system for pressure-fed hybrid rockets which includes high-pressure non-flammable gas fed into the oxidizer tank through a regulator or throttle valve.

Bradford et al. describes a system including a tank containing helium gas under pressure, a tank containing a liquid oxidizer, for example, and a tank containing solid fuel. The helium gas under pressure travels through a conduit into the liquid oxygen tank and expels liquid oxidizer into the solid fuel tank. In Bradford et al., however, the gas is stored at ambient temperature and is not heated prior to being introduced into the oxidizer tank.

Schuler et al., U.S. Pat. No. 5,099,645, discloses a liquid-solid propulsion system including a solid fuel tank and a liquid oxygen tank wherein the liquid oxygen is heated up to become gaseous before it enters the tank containing the solid fuel, and some of the gaseous oxygen is purportedly used to push more liquid oxygen out of the liquid oxygen tank.

Schubert et al., U.S. Pat. No. 3,595,020, discloses a rocket which uses solid fuel. However, the fuel and the oxidizer are both solid. The gas produced by the combustion of the solid fuel and oxidizer pushes on a piston which causes a liquid oxidizer to be ejected from a chamber into a combustion chamber where burnable gases produced by the combustion of the solid fuel and solid oxidizer are burned.

Knuth et al., U.S. Pat. No. 5,101,730, discloses a gas-fed hybrid propulsion system which uses a turbopump to pump oxygen into contact with a solid fuel rocket.

SUMMARY OF THE INVENTION

The apparatus of the present invention solves the problems confronted in the art in a simple and straightforward manner.

Helium stored at cryogenic temperatures and then heated before it enters the oxidizer tank, provides a volumetrically and thermodynamically efficient stored gas pressurization system. This specification describes the use of a hybrid helium heater pressurization system for a pressure-fed hybrid rocket.

Another inert gas or other propellant, such as nitrogen, which will not react with the propelled fuel component and which will not liquify at the temperatures specified herein, could be used instead of helium, though helium is preferred.

The present invention comprises apparatus including a hybrid heater pressurization system, for a rocket comprising a first liquid fuel component and a second fuel component, comprising pressurization means, for forcing the first liquid fuel component into contact with the second fuel component, the pressurization means comprising a gas initially stored at a cryogenic temperature, a hybrid heater having combustion products when ignited for heating the gas by mixing the combustion products of the hybrid heater with the gas, and diffuser means for introducing the heated gas into a container containing the first liquid fuel component.

The gas is preferably inert, and is most preferably helium. The rocket is preferably a hybrid rocket.

The apparatus of the present invention can include the rocket. The apparatus preferably further comprises an electric ignition system for electrically igniting the rocket, which can include a second hybrid heater having combustion products when ignited, the combustion products of the second hybrid heater entering a casing containing the second fuel component when the second hybrid heater is ignited, and spark-producing means for igniting the second hybrid heater. The spark-producing means preferably produces no sparks when in an inert-gas environment, and most preferably is a carbon arc.

Another embodiment of the present invention is an ignition system for igniting a rocket, the rocket comprising a first fuel component and a second fuel component, wherein the second fuel component is in a casing, and the ignition system comprises a hybrid heater having combustion products when ignited, the hybrid heater being connected to the casing and positioned such that the combustion products of the second hybrid heater enter the casing of the second fuel component when the hybrid heater is ignited, and means for igniting the hybrid heater. The means for igniting the hybrid heater is preferably a spark-producing means. The spark-producing means preferably produces no sparks when in an inert-gas environment, and most preferably is a carbon arc.

In another embodiment of the present invention, a hybrid rocket comprises: a rocket case having a first end and a second end; a hybrid motor in the rocket case, adjacent the second end of the rocket case; fuel in the hybrid motor; a tank in the rocket case, intermediate the hybrid motor and the first end of the rocket case, the tank being fluidly connected to the hybrid motor and being at a first, ullage, pressure; liquid oxygen in the tank; a nozzle connected to the second end of the rocket case; a first sphere in the rocket case, intermediate the first end of the rocket case and the tank, the first sphere initially containing helium at a second pressure which is higher than the first pressure and at a cryogenic temperature; a second sphere in the rocket case, intermediate the first end of the rocket case and the tank, the second sphere initially containing gaseous oxygen at a third pressure which is higher than the second pressure; a first hybrid heater for heating the helium initially stored in the first sphere, the first hybrid heater being fluidly connected to the tank, the first hybrid heater generating exhaust when ignited and being positioned such that its exhaust enters the tank; a first gas line for allowing helium to flow from the first sphere to the first hybrid heater; a second gas line for allowing oxygen gas to flow from the second sphere to the first hybrid heater; a second hybrid heater connected to the first sphere, the second hybrid heater generating exhaust when ignited and being positioned such that its exhaust enters the first sphere; a third gas line for allowing oxygen gas to flow from the second sphere to the first sphere; a plurality of pressure transducers for detecting the ullage pressure in the tank; a pressure control mechanism in communication with the pressure transducers; a ganged control valve in communication with the pressure control mechanism, the ganged control valve controlling the flow of helium and oxygen gas from the first sphere and the second sphere, respectively, into the first hybrid heater, in response to the ullage pressure in the tank as detected by the pressure transducers; and a diffuser in the tank for diffusing in the tank helium that has been heated in the first hybrid heater. The rocket further comprise an electric ignition system for electrically igniting the rocket. The electric ignition system for electrically igniting the rocket can includes a third hybrid heater having combustion products when ignited, the combustion products of the third hybrid heater entering the casing of the second fuel component when the third hybrid heater is ignited; a spark-producing means for igniting the third hybrid heater. The spark-producing means preferably produces no sparks when in an inert-gas environment. It is preferably a carbon arc.

Another embodiment is a method of pressurizing a rocket comprising a first liquid fuel component and a second fuel component with pressurization means to force the first liquid fuel component into contact with the second fuel component, comprising the following steps: storing an inert gas initially at a cryogenic temperature; heating the inert gas with a hybrid heater having combustion products when ignited by mixing the combustion products of the hybrid heater with the gas; and introducing the heated inert gas into a container containing the first liquid fuel component.

Yet another embodiment of the present invention is a method of igniting a rocket comprising a first liquid fuel component and a second fuel component, wherein the second fuel component is in a casing, comprising the following steps: providing a hybrid heater having combustion products when ignited; connecting the hybrid heater to the casing; positioning the hybrid heater such that the combustion products of the hybrid heater enter the casing of the second fuel component when the hybrid heater is ignited; and producing a spark to ignite the hybrid heater, which in turn ignites the rocket. The method can further comprise the steps of immersing in an inert-gas environment a spark-producing means which produces no sparks when in an inert-gas environment and causing oxygen to contact the spark-producing means to produce the spark; alternatively, the method could comprise the steps of immersing in an oxygen-containing environment a spark-producing means which produces sparks when electricity is supplied thereto and supplying electricity to the spark-producing means to produce the spark; in either case, the spark-producing means is preferably a carbon arc.

It is an object of the present invention to provide a pressurization system for pressure-fed hybrid rockets which is relatively small and light-weight when compared to currently available pressurization systems.

It is a further object of the present invention to provide a pressurization system for pressure-fed hybrid rockets which is relatively inexpensive when compared to currently available pressurization systems.

It is another object of the present invention to provide a safe, reliable ignition system for rockets. It is important that rockets light cleanly, and a rocket ignited with the ignition system of the present invention will light cleanly.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

PARTS LIST

The following is a list of suitable parts and materials for the various elements of the preferred embodiment of the present invention.

10 hybrid helium heater pressurization system of the present invention
11 hybrid rocket of the preferred embodiment of the apparatus of the present invention
20 oxidizer tank (700 cubic foot capacity containing liquid oxygen ($LO_2$))
21 isolation valve for oxidizer tank 20
22 vent/relief valve for oxidizer tank 20
23 vent/relief line for oxidizer tank 20
28 first end of tank 20
29 second end of tank 20
30 sphere containing gaseous oxygen ($GO_2$)
31 isolation valve for $GO_2$ tank 30
33 $GO_2$ fill/drain, vent/relief line for $GO_2$ tank 30
34 $GO_2$ fill/drain, vent/relief valve for $GO_2$ tank 30
35 ground interface/quick-disconnect valve for $GO_2$ tank 30
36 gaseous oxygen feedline for hybrid helium heater 50
37 gaseous oxygen feedline for hybrid helium tank heater 90
40 Weldalite 049™ GHe sphere
41 helium feedline for hybrid helium heater 50
43 helium fill/drain, vent/relief line for helium tank 40
44 helium fill/drain, vent/relief valve for helium tank 40
45 ground interface/quick-disconnect valve for helium tank 40
50 hybrid helium heater used to heat the cold gaseous helium from tank 40 to pressurize main liquid oxygen tank 20

51 solid fuel in hybrid helium heater 50
55 mixing chamber of hybrid helium heater 50 for mixing hybrid heater hot combustion products and cold gaseous helium
58 first end of hybrid helium heater 50
59 second end of hybrid helium heater 50
60 inlets for helium into hybrid helium heater 50
65 inlet for $GO_2$ into hybrid helium heater 50
70 gaseous helium diffuser
80 ganged control valve for hybrid helium heater 50
81 $GO_2$ valve in ganged control valve 80 in gaseous oxygen line 36
82 helium valve in ganged control valve 80 in gaseous helium line 41
83 pressure transducers (three in number)
84 control module for ganged valve 80 (pressure control mechanism)
90 hybrid helium pressurant tank heater (used to pressurize the cold gaseous helium in helium tank 40)
91 solid fuel in hybrid helium pressurant tank heater 90
100 hybrid motor
101 fuel in hybrid motor 100
108 first end of hybrid motor 100
109 second end of hybrid motor 100
110 intertank
111 nozzle
112 liquid injection thrust vector control valves (LITVC)
115 rocket case
118 first end of rocket case
119 second end of rocket case
210 hybrid heater ignition system for hybrid motor 100
221 carbon electrode
222 carbon electrode
223 preferred spark-producing ignition system for hybrid heaters 50, 90, 250
224 alternative spark-producing ignition system for hybrid heaters 50, 90, 250
225 filament of system 224
226 gap of system 223
230 sphere containing gaseous oxygen ($GO_2$)
231 isolation valve for $GO_2$ tank 30
236 gaseous oxygen feedline for hybrid helium heater 250
240 alternative hybrid heater ignition system for hybrid motor 100
250 hybrid heater used to ignite motor 100
251 solid fuel in hybrid helium heater 250
265 inlet for $GO_2$ into hybrid heater 250

DETAILED DESCRIPTION OF THE PREFERRED EMBODIMENT

Figure 1:
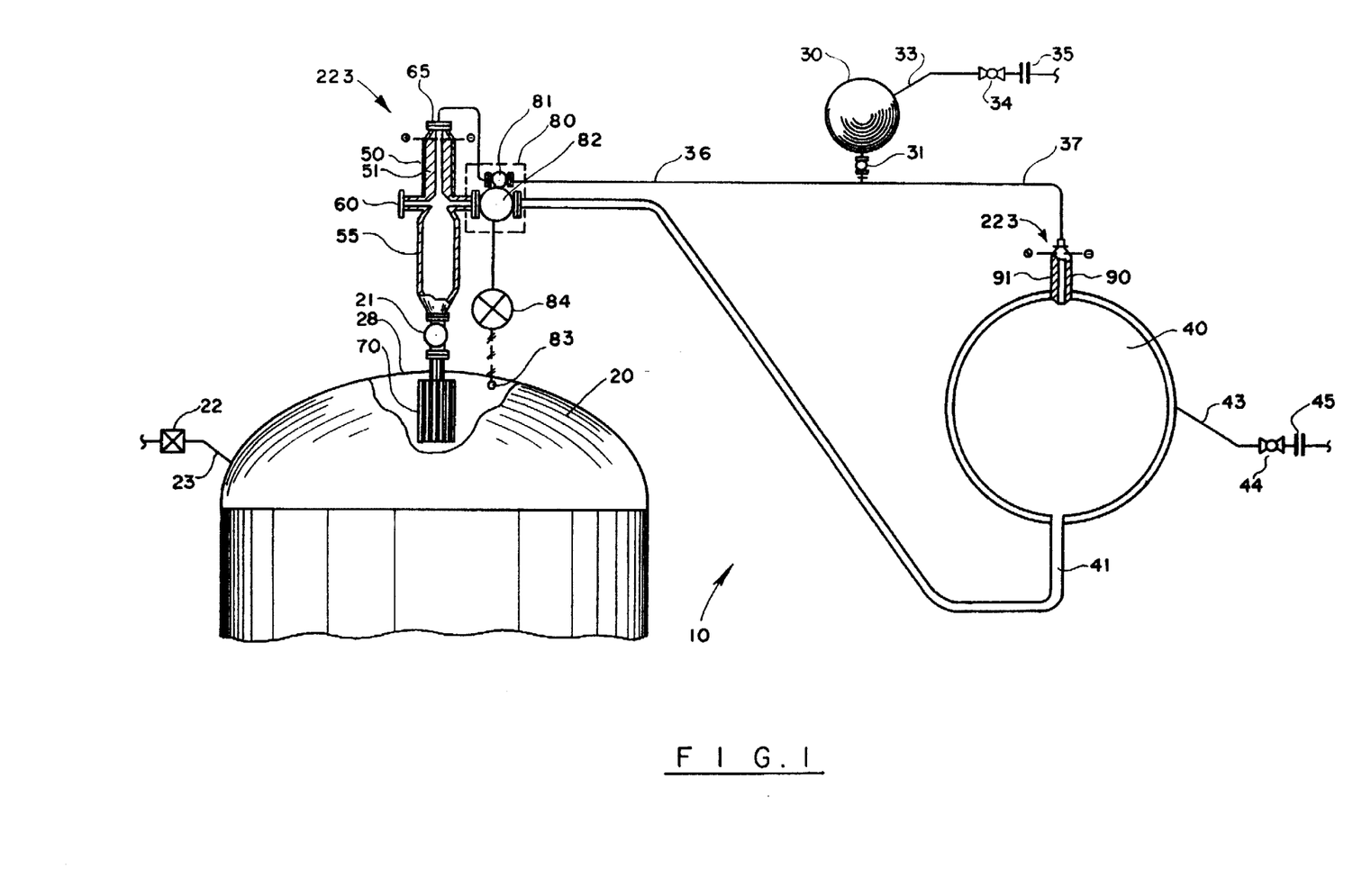
FIG. 1 is a schematic view of the hybrid helium heater pressurization system of the preferred embodiment of the apparatus of the present invention.
Figure 2:
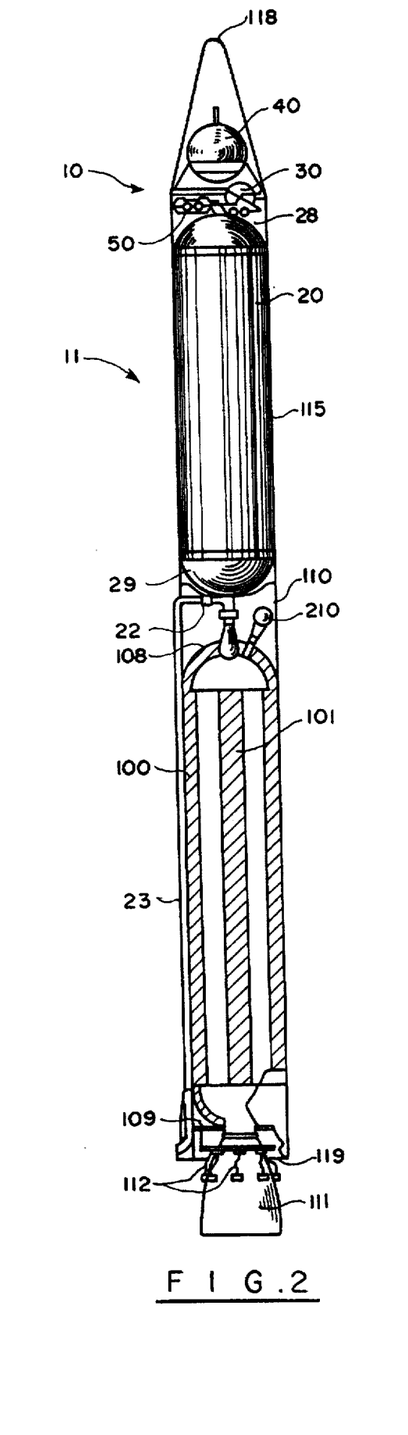
FIG. 2 is a schematic view of the hybrid rocket of the preferred embodiment of the apparatus of the present invention.
Figure 3:
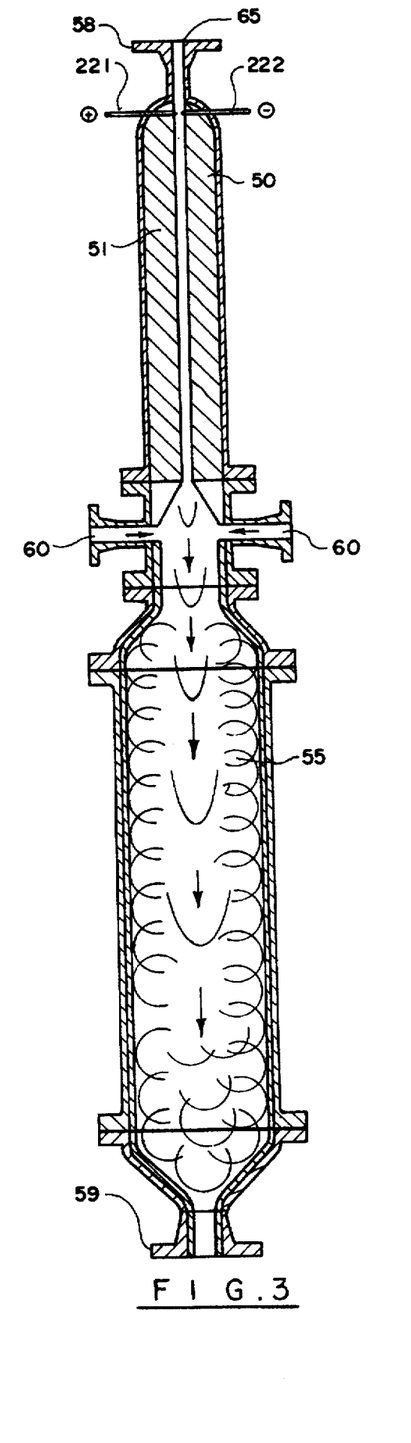
FIG. 3 is a detail of the hybrid helium heater pressurization system of the preferred embodiment of the apparatus of the present invention.

FIGS. 1 through 3 illustrate the preferred embodiment of the pressurization system apparatus of the present invention.

FIG. 1 shows the hybrid helium heater pressurization system 10 of the present invention. It will be described after rocket 11 is described.

FIG. 2 shows a pressure-fed hybrid rocket 11 having an oxidizer tank 20 and a hybrid motor 100 which requires a pressurization system for the oxidizer tank 20 in order to force the oxidizer out of the tank 20 and into the hybrid motor 100.

The American Rocket Company's (AMROC) H-1800 hybrid booster for AMROC's Aquila 31 launch vehicle was used as a baseline for application of the pressurization system. A drawing of a modified version of the H-1800 hybrid booster for the Aquila 31 launch vehicle along with the pressurization system of the present invention is shown in FIG. 2. The pressurization analysis is based on the following parameters: a 700 cubic foot main hybrid $LO_2$ tank 20; a nominal $LO_2$ mass flow rate of 620 lbm/sec (282 kg/sec) for the hybrid motor 100; a liquid injection thrust vector control (LITVC) system 112 utilizing $LO_2$ from the main $LO_2$ tank 20 at a rate corresponding to the trajectory; and a burn time with throttle of 76 seconds.

Rocket 11 includes hybrid motor 100 having hybrid fuel 101 therein, tank 20, and an intertank 110 connecting motor 100 to tank 20. A rocket case 115 having a first, upper end 118 and a second, lower end 119 contains motor 100, tank 20, and hybrid helium heater pressurization system 10. The first, upper end 108 of hybrid motor 100 is connected to tank 20, while the second end 109 of hybrid motor 100 is connected to nozzle 111. Liquid injection thrust vector control valves (LITVC) 112 blow liquid oxygen into nozzle 111 to control the pitch and yaw of rocket 11, and are connected with appropriate means (not shown) to tank 20.

Oxidizer tank 20 has attached thereto a vent/relief valve 22 connecting tank 20 to a vent/relief line 23. Tank 20 has a first, upper end 28 and a second, lower end 29.

The hybrid helium heater pressurization system 10 of the preferred embodiment of the present invention is shown in FIG. 1.

System 10 includes a hybrid heater 50, a mixing chamber 55 for mixing hybrid heater hot combustion products and cold gaseous helium, a sphere 40 for containing helium, a sphere 30 for containing gaseous oxygen, a diffuser 70 for diffusing helium and combustion products in tank 20, and appropriate plumbing and other parts interconnecting these elements, as will be described further. Optionally, some screening mechanism could be included to filter particulates from the helium in sphere 40 to prevent the particulates from entering mixing chamber 55 (the particulates would reduce the effectiveness of the method of the present invention by absorbing heat from heater 50).

One embodiment of the present invention resides in the system 10 for pressurizing the liquid oxygen tank 20. System 10 is shown in detail in FIG. 1, and the hybrid heater 50 is shown in more detail in FIG. 3. The purpose of the pressurization system 10 of the present invention is to provide pressure at the first, upper end 28 of tank 20 in FIG. 2 so that liquid oxygen can exit the second, lower end 29. Hybrid heater 50 creates the pressure by mixing gaseous oxygen (see FIGS. 1 and 3) with the solid fuel in the hybrid heater 50 to create an extremely high temperature. Helium from sphere 40 is then mixed with the combustion products in mixing chamber 55 via an inlet 60 and this hot, inert mixture enters liquid oxygen tank 20 via a diffuser 70. A second hybrid heater 90 pressurizes the gaseous helium sphere 40. Both hybrid heaters 50 and 90 are fed gaseous oxygen from sphere 30.

Smaller hybrid heater 90, used as the pressurant tank heater, supplies sufficient energy to the helium in the storage sphere 40 to reduce the pressure decay caused by the withdrawal of the helium. Hybrid heaters 50, 90 are supplied oxidizer from a single sphere 30 containing gaseous oxygen ($GO_2$) initially stored at 5000 psia and 530° R. (70° F.). The hybrid heaters 50, 90 are ignited at ignition of the main hybrid motor 100. The pressurant (gaseous helium (GHe)) supply and hybrid heater's $GO_2$ supply are controlled by sensing main oxidizer tank 20 ullage pressure to respond to the out-flow rate of liquid oxidizer.

Hybrid helium heater 50 has a first, upper end 58 and a second, lower end 59.

Helium feedline 41 feeds helium from helium tank 40 to hybrid helium heater 50. Helium fill/drain, vent/relief line 43 and helium fill/drain, vent/relief valve 44 are used for fill/drain and vent/relief operations for tank 40. Ground interface/disconnect 45 is used as a ground hook-up for helium tank 40.

Inlets 60 for helium into hybrid helium heater 50 are located on the sides of heater 50 and inlet 65 for $GO_2$ into hybrid helium heater 50 is located at the top thereof.

Isolation valve 21 isolates oxidizer 20 from the pressurization system to allow pre-pressurization of the $LO_2$ oxidizer tank prior to rocket ignition.

Valves 112 blow liquid oxygen into nozzle 111 to control the pitch and yaw of rocket 11.

The purpose of diffuser 70 is to spread out the exhaust gases and helium from heater 50 so that they relatively uniformly push the $LO_2$ in tank 20.

Isolation valve 31 isolates $GO_2$ from the rest of system 10 during fill/drain operations. Isolation valve 31 also serves to prevent gases from flowing from heater 50 into sphere 30 should the pressure in sphere 30 drop below the pressure in heater 50.

There are a $GO_2$ fill/drain, vent/relief line 33, a $GO_2$ fill/drain, vent/relief vent 34, and a ground interface/disconnect 35 for $GO_2$ tank 30. Line 33 and vent 34 are used for fill/drain and vent/relief operations for tank 30.

Figures 4, 5:
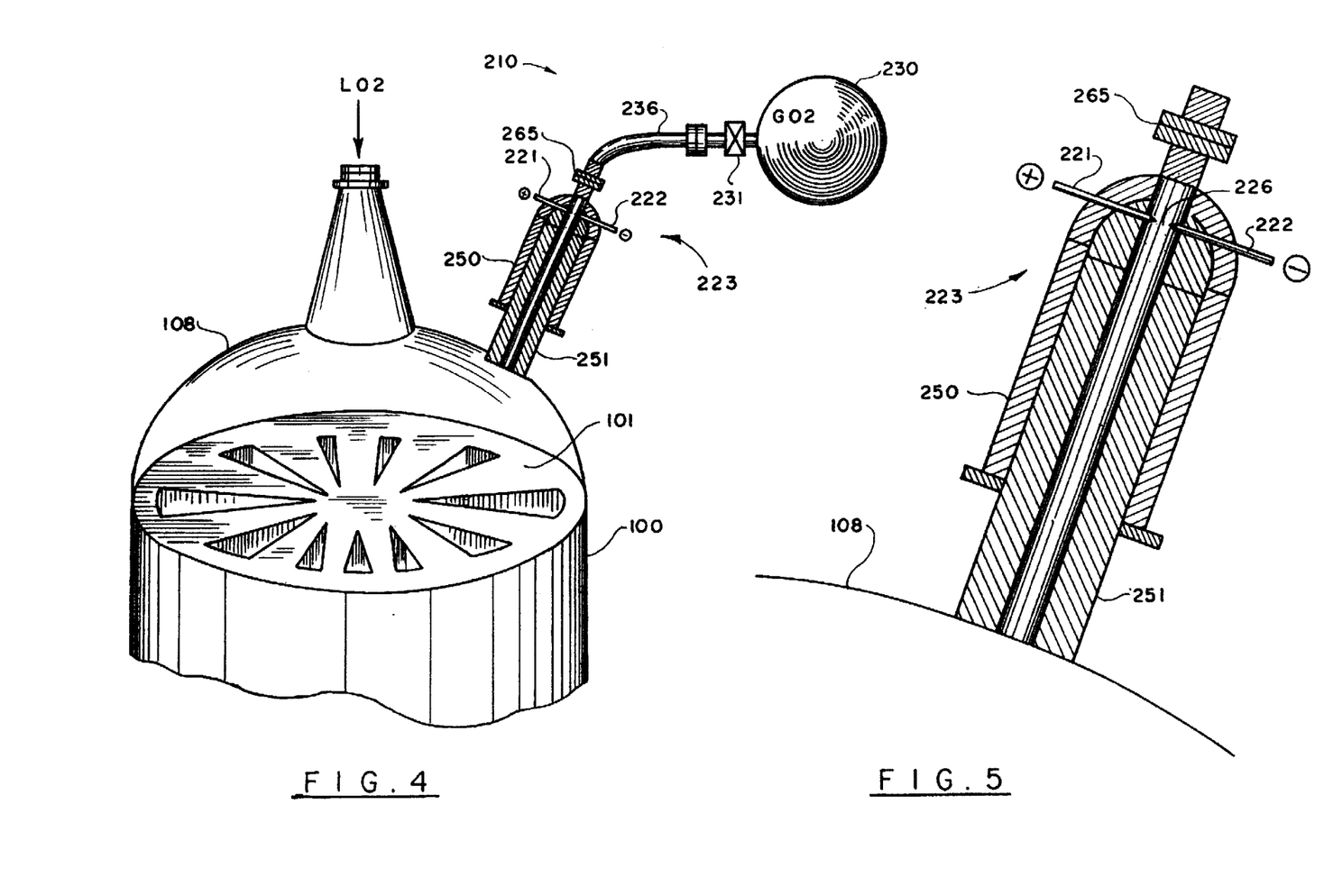
FIG. 4 shows the preferred embodiment of the rocket ignition system of the present invention attached to the hybrid motor.
FIG. 5 is a detail of the system of FIG. 4.
Figures 6, 7:
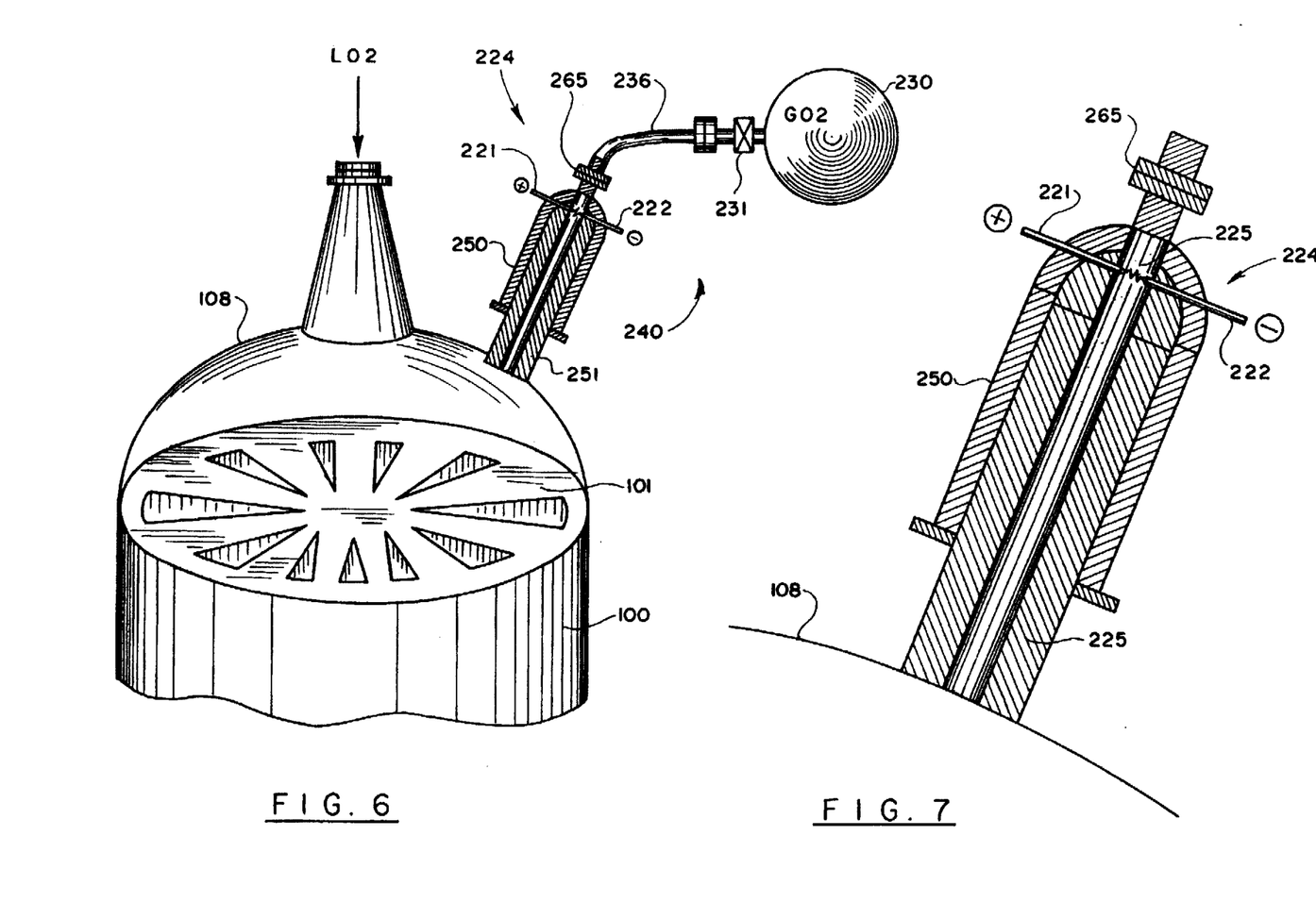
FIG. 6 shows an alternative embodiment of the rocket ignition system of the present invention attached to the hybrid motor.
FIG. 7 is a detail of the system of FIG. 6.

Gaseous oxygen feedline 36 for hybrid helium heater 50 feeds gaseous oxygen from tank 30 to heater 50. Gaseous oxygen feedline 37 for hybrid helium tank heater 90 feeds gaseous oxygen from tank 30 to heater 90. Gaseous oxygen feedline 236 for hybrid helium heater 250 feeds gaseous oxygen from tank 230 to heater 250.

Gaseous helium which is initially stored in tank 40 at 3000 psia and 150° R. (−310° F.) is injected into hybrid helium heater 50 and exits along with the combustion products into the top of the liquid oxygen ($LO_2$) tank 20 at 1400° R. (940° F.), thus providing a very high energy pressurant.

The helium is supercritical (at such a temperature and pressure that increased pressure will only compress it more, but will not cause it to liquify), so it still is and acts as a gas; for that reason, it does not matter that line 41 is at the bottom. The fact that the gas is supercritical allows it to be denser, and thus more can fit in a smaller container. Also, there are particulates in helium sphere 40 which should be filtered out with a screen or some other filter system, because these particulates are extremely cold and will (albeit negligibly) cool off the combustion products of heater 50.

Neon, argon, nitrogen, and the inert gases (those in Group VIII of the periodic table) could be used as the pressurant. The ratio of density stored in the container to density out of container is important, and helium has the best ratio (highest); also, helium is less dense than other inert gases, so an effective amount of helium weighs less than other gases.

The hybrid helium heater 50 uses hydroxyl-terminated polybutadiene (HTPB) as the fuel 51 and is run at an oxidizer-to-fuel mixture ratio of approximately 2.0. $GO_2$ enters the heater at the forward end vaporizing and burning the HTPB as it passes down the grain. There is never any liquid or volatilized fuel that can enter the $LO_2$ tank 20. Gaseous oxygen driven hybrid motors have never exhibited any tendency for unstable combustion. A hybrid motor driven by gaseous oxygen will not extinguish until all the fuel is consumed or the oxygen flow is terminated. Once initiated, the reliability of the combustion is 100%.

Helium gas is introduced into the heater 50 at a point where nearly all the oxygen has reacted and therefore combustion of any type will be limited due to the low concentration of oxygen. The impinging streams of combustion gas and cold helium will promote highly turbulent mixing. The cold helium will quench the combustion stream and reduce the volumetric fraction of oxygen to levels which cannot support combustion. The heater's internal volume increases downstream of the helium injection port 60 to allow for the helium gas to expand and mix with the combustion products in order to promote the transfer of heat to the helium gas. The pressurant/gas mixture exits the heater 50 at approximately 1400° R. (940° F.) and enters a diffuser 70 inside the main $LO_2$ tank 20. An analysis of the thermodynamics of $LO_2$ tank 20 shows the bulk ullage temperature at the end of the burn is approximately 1200° R. (740° F.). The heater 50 outputs an average of 2000 BTU/sec, burning a total of 10 lbm (4.5 kg) of HTPB and 20 lbm (9.1 kg) of $GO_2$. The mass mole fraction of the principal combustion products are carbon monoxide 30%, carbon dioxide 26%, and $H_2O$ 32%. The volume fraction of the total pressurant stream composition is: helium 97.2%, carbon monoxide (CO) 0.9% (reactive), carbon dioxide ($CO_2$) 0.5% (inert), $H_2O$ 1.4% (inert), trace oxygen (reactive). In an environment of 97 percent helium there is not concern of burning hydrocarbons or any other species.

The hybrid pressurant tank heater 90 uses HTPB as the fuel 91 and $GO_2$ as the oxidizer. In this case the combustion products are the pressurant of the GHe sphere 40. The heater 90 outputs an average of 200 BTU/sec into the GHe sphere 40, therefore burning approximately one lbm (0.454 kg) of HTPB and two lbm (0.909 kg) of $GO_2$.

The $GO_2$ is stored in a 16-inch diameter sphere 30 at ambient temperature. The initial mass of $GO_2$ in the sphere 30 is approximately 32 lbm (14.5 kg). The hybrid helium heater 50 will burn 20 lbm (9.09 kg) of $GO_2$, the hybrid pressurant tank heater 90 will burn two lbm (0.909 kg) of $GO_2$, and approximately 10.0 lbm (4.55 kg) of $GO_2$ will be unusable residual in the $GO_2$ sphere 30. The pressure and temperature of the $GO_2$ sphere 30 decays from 5000 psia and 530° R. (70° F.) to 600 psia and 290° R. (−170° F.) isentropically. A ganged control valve 80 for the heater 50 adjusts the $GO_2$ flow rate, and therefore the heat output, to correspond to the helium flow rate required to fulfill the ullage pressure requirement of $LO_2$ tank 20. A constant pressurant exit temperature is maintained. The pressurant tank heater 90 does not require active control. An orifice to limit the $GO_2$ flow rate is sufficient to limit the maximum heating rate of the heater 90.

Ganged control valve 80 for hybrid helium heater 50 includes a $GO_2$ valve 81 in gaseous oxygen line 36 and a helium valve 82 in gaseous helium line 41. There are three pressure transducers 83 (although but one is shown in the drawings) which monitor pressure in liquid oxygen tank 20 and feed a signal to a control module 84 for ganged valve 80. Module 84 includes a pressure control mechanism which controls the flow of gaseous oxygen and helium to hybrid helium heater 50 by controlling the amount of gaseous oxygen and helium to flow through valve 80.

The Weldalite 049™ GHe sphere 40 is 46 inches in diameter and has a wall thickness of approximately 0.5 inch.

The novel ignition system 210 of the present invention is shown in FIGS. 4–7.

The preferred embodiment of the ignition system of the present invention, hybrid heater ignition system 210, is shown in FIGS. 4 and 5. Ignition system 210 is used to ignite hybrid motor 100. Components such as some of the components of system 210 can also be used to ignite hybrid heaters 50 and 90, as will be described further.

Ignition system 210 includes a hybrid helium heater 250 for igniting motor 100, a sphere 230 containing gaseous oxygen ($GO_2$), and a spark-producing ignition system 223 for igniting motor 250. Spark-producing ignition system 223 is a carbon arc with carbon electrodes 221 and 222 separated by a small gap 226.

Hybrid heater 250 contains solid fuel 251 and an inlet 265 for allowing $GO_2$ to enter into hybrid helium heater 250. It can be attached in any conventional manner to motor 100 such that its combustion products are ejected into motor 100. The hybrid helium heater 250 uses hydroxyl-terminated polybutadiene (HTPB) as the fuel 251 and is run at an oxidizer-to-fuel mixture ratio of approximately 2.0. $GO_2$ enters the heater at the forward end vaporizing and burning the HTPB as it passes down the grain. Hybrid heater 250 both ignites motor 100 and pre-heats the liquid oxygen coming out of LOX tank 20. As can be seen in FIG. 4, it is positioned at an angle firing into motor 100 adjacent the upper end 108 of motor 100.

An isolation valve 231 isolates $GO_2$ in tank 230 from gaseous oxygen feedline 236 for hybrid helium heater 250. There could optionally be included for sphere 230 a $GO_2$ fill/drain, vent/relief line such as line 33 for $GO_2$ tank 30, a $GO_2$ fill/drain, vent/relief vent such as vent 34 for $GO_2$ tank 30, and a ground interface/quick-disconnect valve such as valve 35 for $GO_2$ tank 30.

Spark-producing ignition system 223 includes carbon electrodes 221 and 222, separated by a gap 226. Spark-producing ignition systems 223 are used to ignite heaters 50, 90, and 250.

The gaseous oxygen in sphere 230 is used to oxidize the solid fuel 251 in hybrid helium heater 250, and hybrid helium heater 250 is used to ignite motor 100.

In operation, rocket 11 is assembled as shown, with sphere 30 having been filled via line 33 and valves 34 and 35, and sphere 40 having been filled via line 43 and valves 45. Initially the sphere 40 is filled and flushed with liquid nitrogen ($LN_2$) until the metal temperature is lowered to approximately 145° R. (−315° F.). The sphere 40 is then filled with GHe which has passed through a ground support equipment (GSE) heat exchanger to reduce the GHe temperature from its stored condition to approximately 150° R. (−310° F.) inside the sphere. The GHe sphere 40 pressure will decay from 3000 psia at ignition to 600 psia at the end of burn thus providing sufficient pressure to maintain the $LO_2$ tank 20 ullage pressure above the minimum requirement of 450 psia at the end of burn. The GHe temperature at the end of burn will be approximately 400° R. (−60° F.). Heating the gaseous helium from the cryogenic temperature at which it is stored causes its pressure to increase (PV= nRT), thereby contributing to the pressure necessary to force liquid oxygen out of tank 20. Sphere 250 can have been filled through valve 231 or through a valve and line system similar to valves 34 and 35 and line 33.

Initially, lines 36, 37, and 236 and motors 50, 90, and 250 are filled with an inert gas, such as helium. Electricity is supplied to electrodes 221 and 222 by any conventional, suitable means (not shown). For example, 50 V can be applied across gap 226, using a 30 amp, 400 hertz AC source. Since helium has a very high ionization potential, a voltage can be applied across gap 226 between electrodes 221 and 222 without creating a spark. This setup is stable and produces no safety hazard. When it is desired to ignite rocket 11, valves 31, 81, and 231 are opened. Gaseous oxygen then enters motors 50, 90, and 250, and the low ionization potential of the gaseous oxygen allows spark production across gap 226, causing rapid, high intensity combustion of the carbon which propagates to and ignites the hybrid fuel 51, 91, and 251, respectively. Motor 250 in turn ignites motor 100 by providing the heat necessary to ignite the combination of the oxygen supplied by tank 20 and the hybrid fuel 101 in motor 100.

Instead of the ignition sparks occurring when valves 31, 81, and 231 are opened, one could open valves 31, 81, and 231 in advance of ignition, and refrain from supplying electricity to electrodes 221 and 222 until it is desired to create the sparks when electricity is supplied to electrodes 221 and 222.

Heater 250 causes liquid oxygen entering the upper end 108 of motor 100 to vaporize into gaseous oxygen, so that $GO_2$, not $LO_2$, reacts with the hybrid fuel 101 in motor 100. The complex combustion and resulting instability and rough combustion associated with $LO_2$-fed systems is not present in the safe stable $GO_2$-driven hybrid.

The advantage of using helium stored at high pressure and low temperature, and then heating it, is that it expands rapidly and at a relatively high pressure.

The gas in sphere 30 is at a higher pressure than is the gas in sphere 40, which in turn is at a higher pressure than the required ullage pressure in tank 20, to ensure that the gases will flow in the desired direction.

Spark-producing ignition system 224 (see FIGS. 6 and 7) is an alternative spark-producing ignition system which could be used to create a spark to ignite hybrid heaters 50, 90, 250. System 224 differs from system 223 in that a filament 225 replaces cap 226 of system 223. System 224 is part of alternative hybrid heater ignition system 240 for hybrid motor 100. It works in the same manner, however, in that a current can flow in the filament 225 without creating a spark when the filament 225 is surrounded by an inert gas, such as helium. When oxygen comes into contact with filament 225 when current (e.g., 15 amps supplied by a 24 V battery) is flowing therethrough, a spark is created, igniting heaters 50, 90, and 250 (assuming that system 224 replaces system 223 in each heater). However, system 223 is preferred because it can be used more than once, while in system 224 the filament 225 will need to be replaced after use before system 224 can be used again.

The hybrid helium pressurization system disclosed herein can be used for hybrid rockets and some liquid propulsion systems.

The hybrid helium pressurization system disclosed herein differs from Schuler et al. primarily in that: the present invention uses an inert gas (which is important to prevent burn-up of container 40 and is safer, too); in the present invention there is a separate container 40 for the pressurant, which allows the present invention to more easily have higher pressure; the heater exhaust in the present invention directly mixes with the gas, which is more efficient and helps maintain high pressure.

Exemplary dimensions for the apparatus of the present invention are as follows:

length of oxidizer tank 20—300.0 inches;

length of motor 100 (from first end 108 to second end 109 (upper end of nozzle 111))—385.5 inches;

length of rocket case 115—867.0 inches;

diameter of rocket case 115—74 inches;

distance from upper tip of rocket case 115 to lower end of nozzle 111—946.93 inches;

largest diameter of nozzle 111—62.4 inches;

diameter of gaseous helium sphere 40—46 inches;

wall thickness of gaseous helium sphere 40—0.5 inch;

diameter of gaseous oxygen sphere 30—16 inches.

Other propellants, such as nitrogen (or oxygen when oxygen is the fuel component being propelled), which do not react with the fuel component being propelled, could be used instead of helium as the propellant in the system of the present invention. However, helium is the most preferable propellant, for both safety and efficiency reasons.

As used herein "fuel component" refers to fuels and oxidizers which react with fuels to cause combustion.

The foregoing embodiments are presented by way of example only; the scope of the present invention is to be limited only by the following claims.

I claim:

1. Apparatus including a hybrid heater pressurization system, for a rocket comprising a first liquid fuel component and a second fuel component, comprising pressurization means, for forcing the first liquid fuel component into contact with the second fuel component, the pressurization means comprising:

(i) a gas initially stored at a cryogenic temperature;

(ii) a hybrid heater having a longitudinal axis and generating combustion products when ignited for heating the gas by mixing the combustion products of the hybrid heater with the gas in a mixing chamber; the gas being injected through ports circumferentially disposed about the axis; and (iii) diffuser means for introducing the heated gas into a container containing the first liquid fuel component.

2. The apparatus of claim 1, wherein the gas is inert.

3. The apparatus of claim 2, wherein the inert gas is helium.

4. The apparatus of claim 1, wherein the rocket is a hybrid rocket.

5. The apparatus of claim 1, further comprising the rocket.

6. The apparatus of claim 5, wherein the rocket is a hybrid rocket.

7. The apparatus of claim 5, further comprising an electric ignition system for electrically igniting the rocket.

8. The apparatus of claim 7, wherein:

the second fuel component is in a casing; and the electric ignition system for electrically igniting the rocket includes:

a second hybrid heater having combustion products when ignited, the combustion products of the second hybrid heater entering the casing of the second fuel component when the second hybrid heater is ignited; and spark-producing means for igniting the second hybrid heater.

9. The apparatus of claim 8, wherein:

the spark-producing means produces no sparks when in an inert-gas environment.

10. The apparatus of claim 9, wherein:

the spark-producing means is a carbon arc.

11. The apparatus of claim 5, further comprising a rocket case containing the rocket and the hybrid heater pressurization system, and wherein the gas is initially stored in the rocket case at a cryogenic temperature.

12. The apparatus of claim 11, further comprising a second container for initially storing the gas and a second heater for heating the gas while the gas is in the second container.

13. The apparatus of claim 12, wherein the second heater comprises a second hybrid heater.

14. The apparatus of claim 1, further comprising an ignition system for igniting a rocket, wherein the second fuel component is in a casing, and the ignition system comprises:

a second hybrid heater having combustion products when ignited, the second hybrid heater being connected to the casing and positioned such that the combustion products of the second hybrid heater enter the casing of the second fuel component when the second hybrid heater is ignited; and means for igniting the second hybrid heater.

15. The apparatus of claim 14, wherein:

the means for igniting the second hybrid heater is a spark-producing means.

16. The apparatus of claim 15, wherein:

the spark-producing means produces no sparks when in an inert-gas environment.

17. The apparatus of claim 16, wherein:

the spark-producing means is a carbon arc.

18. The apparatus of claim 14, further comprising the rocket.

19. The apparatus of claim 18, wherein the rocket is a hybrid rocket.

20. The apparatus of claim 18, further comprising a rocket case in which are contained the first liquid fuel component, the second fuel component, and the pressurization means.

21. The apparatus of claim 1, further comprising a hybrid rocket comprising:

(a) a rocket case (115) having a first end (118) and a second end;

(b) a hybrid motor (100) in the rocket case (115), adjacent the second end (119) of the rocket case (115);

(c) fuel (101) in the hybrid motor (100);

(d) a tank (20) in the rocket case, intermediate the hybrid motor (100) and the first end (118) of the rocket case (115), the tank (20) being fluidly connected to the hybrid motor (100) and being at a first, ullage, pressure;

(e) liquid oxygen in the tank (20);

(f) a nozzle (111) connected to the second end (119) of the rocket case (115);

(g) a first sphere (40) in the rocket case (115), intermediate the first end (118) of the rocket case and the tank (20), the first sphere (40) initially containing helium at a second pressure which is higher than the first pressure and at a cryogenic temperature, the helium comprising the gas initially stored at a cryogenic temperature;

(h) a second sphere (30) in the rocket case (115), intermediate the first end (118) of the rocket case and the tank (20), the second sphere (30) initially containing gaseous oxygen at a third pressure which is higher than the second pressure;

(i) means for fluidly connecting the hybrid heater (50) to the tank (20), the hybrid heater (50) generating exhaust when ignited and being positioned such that its exhaust enters the tank (20);

(j) a first gas line (41) for allowing helium to flow from the first sphere (40) to the hybrid heater (50);

(k) a second gas line (36) for allowing oxygen gas to flow from the second sphere (30) to the hybrid heater (50);

(l) a second hybrid heater (90) connected to the first sphere (40), the second hybrid heater (90) generating exhaust when ignited and being positioned such that its exhaust enters the first sphere (40);

(m) a third gas line (37) for allowing oxygen gas to flow from the second sphere (30) to the first sphere (40);

(n) a plurality of pressure transducers (83) for detecting the ullage pressure in the tank (20);

(o) a pressure control mechanism (84) in communication with the pressure transducers (83); and (p) a ganged control valve (80) in communication with the pressure control mechanism (84), the ganged control valve (80) controlling the flow of helium and oxygen gas from the first sphere (40) and the second sphere (30), respectively, into the first hybrid heater (50), in response to the ullage pressure in the tank (20) as detected by the pressure transducers (83).

22. The apparatus of claim 21, further comprising an electric ignition system for electrically igniting the rocket.

23. The apparatus of claim 22, wherein:

the electric ignition system for electrically igniting the rocket includes:

a third hybrid heater having combustion products when ignited, the combustion products of the third hybrid heater entering the casing of the second fuel component when the third hybrid heater is ignited; and spark-producing means for igniting the third hybrid heater.

24. The apparatus of claim 23, wherein:

the spark-producing means produces no sparks when in an inert-gas environment.

25. The apparatus of claim 24, wherein:

the spark-producing means is a carbon arc.

26. The apparatus of claim 1, wherein the mixing chamber is between the hybrid heater and the container for containing the first liquid fuel component.

27. The apparatus of claim 26, further comprising a second container for initially storing the gas and a second heater for heating the gas while the gas is in the second container.

28. The apparatus of claim 27, wherein the second heater comprises a second hybrid heater.

29. The apparatus of claim 1, further comprising a second container for initially storing the gas and a second heater for heating the gas while the gas is in the second container.

30. The apparatus of claim 24, wherein the second heater comprises a second hybrid heater.

* * * * *